United States Patent Office 3,182,067
Patented May 4, 1965

3,182,067
BENZODIAZEPINE COMPOUNDS
Rodney Ian Fryer, West Orange, Robert August Schmidt, Wallington, and Leo Henryk Sternbach, Upper Montclair, N.J., assignors to Hoffmann-La Roche Inc., Nutley, N.J., a corporation of New Jersey
No Drawing. Filed Apr. 9, 1964, Ser. No. 358,613
8 Claims. (Cl. 260—296)

This application relates to a group of novel medicinally valuable pyridine compounds and intermediates therefor. The novel medicinally acceptable pyridine compounds of this invention are benzodiazepine compounds directly joined in the 5-position to a cyclic carbon atom of the pyridine nucleus. More particularly, the novel medicinally valuable compounds of the invention are selected from the group consisting of 7-$R_4$-5-pyridyl-1-$R_1$-3-$R_3$-3H-1,4-benzodiazepin-2(1H)-one, acid-addition salts thereof, 7-$R_4$-5-pyridyl-1-$R_1$-3-$R_3$-3H-1,4-benzodiazepin-2(1H)-one 4-oxide, acid-addition salts thereof, 7-$R_4$-5-pyridyl-2-($R_2$-amino)-3-$R_3$-3H-1,4-benzodiazepine 4-oxide, acid-addition salts thereof, 7-$R_4$-2,3-dihydro-5-pyridyl-1-$R_1$-3-$R_3$-1H-1,4-benzodiazepine and acid addition-salts thereof; wherein $R_1$, $R_2$ and $R_3$ are each selected from the group consisting of hydrogen and lower alkyl and $R_4$ is selected from the group consisting of hydrogen, halogen, nitro, cyano and trifluoromethyl.

The compounds referred to above as 7-$R_4$-5-pyridyl-2-($R_2$-amino)-3-$R_3$-3H-1,4-benzodiazepine 4-oxides are of the formula (I)

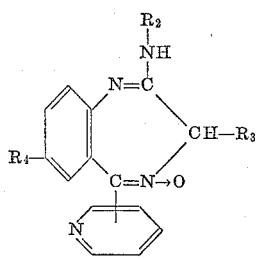

wherein $R_2$ and $R_3$ are selected from the group consisting of hydrogen and lower alkyl, and $R_4$ is selected from the group consisting of hydrogen, halogen, nitro, cyano and trifluoromethyl.

The compounds referred to above as 7-$R_4$-5-pyridyl-1-$R_2$-3-$R_3$-3H-1,4-benzodiazepin-2(1H)-one 4-oxides are of the formula (II)

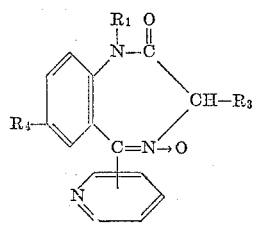

wherein $R_1$ and $R_3$ are selected from the group consisting of hydrogen and lower alkyl, and $R_4$ is selected from the group consisting of hydrogen, halogen, nitro, trifluoromethyl and cyano.

The compounds referred to above as 7-$R_4$-5-pyridyl-1-$R_1$-3-$R_3$-3H-1,4-benzodiazepin-2-(1H)-ones are of the formula (III)

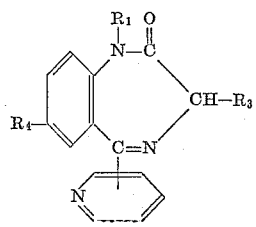

wherein $R_1$ and $R_3$ are selected from the group consisting of lower alkyl and hydrogen and $R_4$ is selected from the group consisting of hydrogen, halogen, nitro, trifluoromethyl and cyano.

The compounds referred to above as 7-$R_4$-2,3-dihydro-5-pyridyl-1-$R_1$-3-$R_3$-1H-1,4-benzodiazepine are of the formula (IIIa)

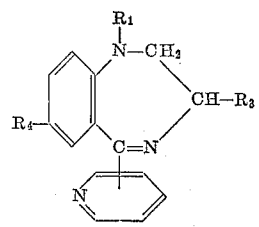

wherein $R_1$ and $R_3$ are selected from the group consisting of lower alkyl and hydrogen and $R_4$ is selected from the group consisting of hydrogen, halogen, nitro-trifluoromethyl and cyano.

As used herein, the term "lower alkyl" includes both straight and branched chained carbon-hydrogen containing radicals, such as methyl, ethyl, propyl, isopropyl, butyl, isobutyl, and the like. The term "halogen" includes all four halogens, i.e., iodine, bromine, chlorine and fluorine. As set forth above, the novel medicinally valuable pyridine compounds of the invention (represented by Formulae I, II, III and IIIa above) from acid-addition salt. More particularly, they form medicinally acceptable acid-addition salts with pharmaceutically acceptable acids including both inorganic and organic acids, such as hydrochloric acid, hydobromic acid, nitric acid, sulfuric acid, acetic acid, formic acid, succinic acid, maleic acid, p-toluene sulfonic acid and the like.

Also included within the purview of the present invention are compounds of Formulae III and IIIa above which contain an amino group in the 7-position. Such compounds can be prepared in the manner more fully set out hereinafter by reduction of a compound of a compound of Formulae III and IIIa above wherein $R_4$ is nitro.

The novel compound of the invention represented by Formulae I, II, III and IIIa above can be made via a variety of reaction routes. In one comprehensive aspect, a (2-aminobenzoyl)-pryidine is utilized as a starting material.

One reaction route for preparing compounds of Formula I above comprising reacting (2-aminobenzoyl)-pryidine or a corresponding compound bearing a halo, nitro, trifluoromethyl or cyano substituent in the 5-position of the phenyl radical with hydroxylamine to form the corresponding oxime derivative of the formula (IV)

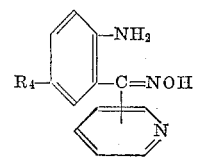

where $R_4$ has the meaning as above.

The oxime of Formula IV above is then haloacetylated with a haloacetyl halide to yield a (2-haloacetamidobenzoyl)-pyridine oxime of the formula (V)

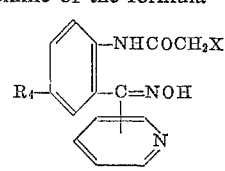

wherein $R_4$ has the same meaning as above, and X is halogen.

This compound upon treatment with acid agents dehydrates to form the corresponding 6-$R_4$-2-halomethyl-4-pyridyl-quinazoline 3-oxide of the formula (VI) 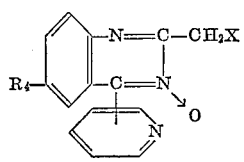

where $R_4$ and X have the same meaning as above.

If $R_4$ in compound of Formula V above be cyano, an acid agent such as borontrifluoride or aluminum chloride and the like is utilized to effect the conversion thereof to the corresponding compound of Formula VI above.

The quinazoline of Formula VI above upon treatment with ammonia or mono-lower alkylamine yields a compound corresponding to Formula I above. Alternatively, the quinazoline of Formula VI above can be treated with an alkaline material, such as an inorganic base or a quaternary ammonium base, to yield a compound corresponding to Formula II above. Exemplary of inorganic bases which can be used are alkali metal hydroxides, such as sodium hydroxide, or alkaline earth metal hydroxides. Advantageously, the reaction with the inorganic base is conducted in the presence of an inert organic solvent such as alcohol, acetone, dioxane or the like. It is also possible to use a quaternary ammonium base, preferably in the form of an anion exchange resin, as the alkaline material.

Compounds corresponding to Formula III above can be directly synthesized by reacting a (2-aminobenzoyl)-pyridine with an amino acid of the formula (VII) 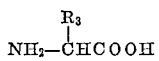

wherein $R_3$ has the same meaning as above, or a lower-alkyl ester thereof.

Thus when glycine or a glycine lower alkyl ester is used, the compound formed corresponding to Formula III above will have $R_3$ as hydrogen.

Another route of making compounds of Formula III above is to first react the (2-aminobenzoyl)-pyradine with a haloacetylating agent of the formula (VIII) 

wherein $R_3$ has the same meaning as above and X is halogen, preferably chlorine or bromine.

This reaction will yield a [2-(α-halo)-lower alkanoyl-aminobenzoyl]-pyridine of the formula (IX) 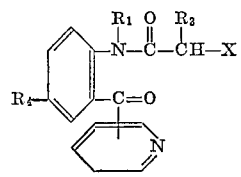

wherein $R_1$, $R_3$ and $R_4$ have the same meaning as above and X is halogen.

This compound need not be isolated, but the reaction mixture containing it can be directly treated with ammonia to form a compound of the formula (X) 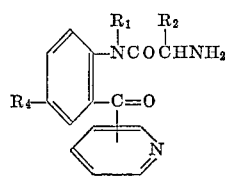

wherein $R_1$ and $R_4$ have the same meaning as above.

The compounds of Formula X above can be ring closed to the corresponding compound of Formula III above either by being permitted to stand at room temperature; by the application of heat; by treatment with base, such as ammonia; or by both application of heat and treatment with base. The compound of Formula X above need not be isolated prior to ring closure but the ring closure to the compound of Formula III above can be effected in situ in the reaction mixture containing the compound of Formula X.

Yet another route of forming compounds corresponding to Formula III above wherein $R_4$ is selected from the group consisting of hydrogen, trifluoromethyl, nitro and halogen is to react the (2-aminobenzoyl)-pyridine with carbobenzoxyglycine thereby forming a compound of the formula (XI) 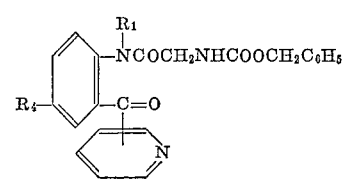

wherein $R_1$ and $R_4$ have the same meaning as above.

The compound corresponding to Formula XI above is then treated with a hydrobromic acid-acetic acid mixture to hydrolyze the carbobenzoxy group to a compound corresponding to Formula X above, which then, either with or without isolation, can be converted as described above into the corresponding compound of Formula III above wherein $R_4$ is selected from the group consisting of hydrogen, halogen, trifluoromethyl and nitro.

Compounds of Formula IIIa above can be derived by reducing compounds of Formula III above, e.g., compounds of Formula III above wherein $R_4$ is hydrogen, halogen or trifluoromethyl can be reduced with lithium aluminum hydride in the presence of a conventional organic solvent such as tetrahydrofuran to thereby obtain compounds of Formula IIIa above.

Another valuable preparative route for the preparation of compounds of the Formula IIIa above wherein $R_4$ is selected from the group of hydrogen, trifluoromethyl, halogen, cyano and nitro involves reacting a compound of the formula (XIV) 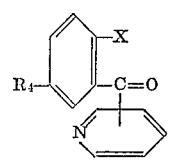

wherein $R_4$ is as above and X is halogen, i.e., chlorine, fluorine, bromine and iodine, with an alkylene-1,2-diamine of the formula (XV) 

wherein $R_3$ has the same meaning as above.

The process can either proceed directly to compounds of Formula IIIa above or through intermediates of the formula (XVI) 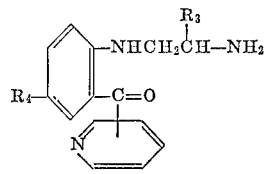

wherein $R_3$ and $R_4$ have the same meaning as in Formula IIIa above, which can then be cyclized to compounds of Formula IIIa above.

In a preferred embodiment, elevated temperatures are utilized when effecting the conversion of compounds of Formula XIV above to compounds of Formula IIIa above via the reaction thereof with an alkylene-1,2-diamine of the Formula XV above, e.g., at an elevated temperature above about 75° C. Representative of alkylene-1,2-diamines suitable for the purposes of the present invention is, for example, ethylenediamine. The alkylene-1,2-diamine utilized can be present in excessive amounts whereby it serves per se as the reaction media. In an alternative procedure, a conventional inert organic solvent such as a lower alkanol or a tertiary base such as pyridine, picoline, quinoline and the like can be used as the reaction media. A preferred embodiment of the last-mentioned process aspect of the present invention comprises reacting a (2-halobenzoyl)pyridine, advantageously, a (2-chlorobenzoyl)pyridine with ethylenediamine.

The intermediates of Formulae XIV and XVI above are novel and are useful in the preparation of compounds of Formula IIIa above.

Compounds of Formula XIV can be prepared by reacting a pyridyl Grignard reagent, e.g. pyridyl lithium or pyridyl magnesium halide, with a 2-halobenzonitrile, e.g., a compound of the formula

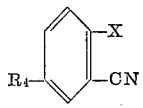

wherein $R_4$ and X are as above, or by converting an ortho-halo-halobenzene to the Grignard reagent and reacting the so-formed reagent with cyano pyridine.

Compounds of Formula XIV above can also be prepared by oxidizing a compound of the formula

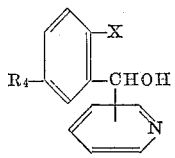

wherein $R_4$ and X are as above, with a conventional oxidizing agent which may be chromic acid and the like. Compounds of Formula XIV above wherein $R_4$ is nitro may be prepared from the corresponding compound wherein $R_4$ is hydrogen by treatment thereof with nitric acid in the presence of a mineral acid such as sulfuric acid. Compounds of Formula XIV above wherein $R_4$ is nitro can be converted, if desired, to the corresponding compound of Formula XIV above wherein $R_4$ is halogen or cyano by the techniques described hereinbelow in connection with the corresponding conversion of compounds of Formula IIIa above wherein $R_4$ is nitro.

Compounds of Formula IIIa above wherein $R_4$ is nitro can be reduced by conventional techniques, i.e., hydrogenation in the presence of Raney nickel to form the corresponding compound wherein $R_4$ is amino. The resultant compound wherein $R_4$ is amino, if desired, can be selectively converted into the corresponding compound wherein $R_4$ is halogen or cyano by treatment thereof with nitrous acid in the presence of a mineral acid, e.g., hydrochloric acid, followed by the treatment of the resulting substance with a strong hydrohalic acid, e.g., hydrochloric acid in the presence of a copper catalyst, e.g., cuprous chloride in the case where a compound of Formula IIIa above wherein $R_4$ is halogen is desired, and cuprous cyanide in the case where a compound of Formula IIIa above wherein $R_4$ is cyano is desired.

The substituents denoted $R_4$ in Formulae I, II, III and IIIa above can be obtained as other than hydrogen by treatment of the starting material (2-aminobenzoyl)-pyridine or by treatment of the end-product benzodiazepine. Thus, for example, a (2-aminobenzoyl)-pyridine can be directly halogenated or nitrated or can be halogenated and nitrated by conversion to (2-acetaminobenzoyl)- pyridine which can be halogenated or nitrated to a compound of the formula (XII) 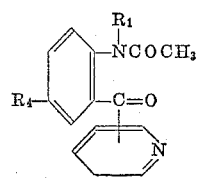

wherein $R_1$ has the same meaning as above, and $R_4$ is selected from the group consisting of halogen and nitro, which in turn can then be hydrolyzed to the corresponding (2-amino-5-substituted-benzoyl)-pyridine intermediate of the formula (XIII) 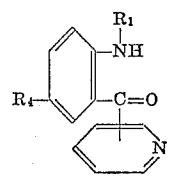

wherein $R_1$ has the same meaning as above, and $R_4$ is selected from the group consisting of halogen and nitro.

Another valuable route for the preparation of (2-amino-5-substituted-benzoyl)-pyridine intermediates of the formula (XVII) 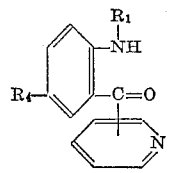

wherein $R_1$ is selected from the group consisting of hydrogen and lower alkyl and $R_4$ is selected from the group consisting of halogen, trifluoromethyl, nitro and cyano, involves treating compounds of Formula XIV above wherein $R_4$ is selected from the group consisting of halogen, trifluoromethyl, nitro and cyano with ammonia or a primary lower alkyl amine, e.g., methylamine, in the presence of a suitable solvent such as water, a lower alkanol such as ethanol and propanol or an ether such as dioxane and the like. Preferably, the reaction is effected at an elevated temperature, advantageously in the presence of a copper catalyst such as cuprous chloride.

In addition to nitrating or halogenating, the end product, compounds corresponding to Formulae II, III and IIIa above wherein $R_1$ is lower alkyl can be synthesized from compounds corresponding to Formulae II, III and IIIa above wherein $R_1$ is hydrogen by alkylating such compounds. The alkylation can be efficaciously effected by treating compounds corresponding to Formulae II, III and IIIa above wherein $R_1$ is hydrogen with sodium hydride or a sodium alcoholate such as sodium methoxide in the presence of an inert organic solvent such as toluene to thereby form the sodio derivative of such compounds, and then reacting the sodio derivative with a dialkyl sulfate or an alkyl halide in an inert solvent, for example, a hydrocarbon or dimethylformamide. Suitable dialkyl sulfates may be represented by dimethyl sulfate. Similarly, suitable alkyl halides may be represented by methyl iodide.

The novel medicinally valuable compounds of this invention conforming to Formulae I, II, III and IIIa above are useful as sedative, muscle relaxants and anticonvulsants. They can be administered internally, for example, orally or parenterally and can be compounded into conventional pharmaceutical dosage forms with dosage adjusted to individual requirements such as capsules, tablets, suppositories, suspensions, solutions and the like.

This application is a continuation-in-part of application Serial No. 274,303, filed April 19, 1963, now abandoned, in the names of Rodney Ian Fryer, Robert August Schmidt and Leo Henryk Sternbach; the last-mentioned application being a continuation-in-part of application Serial No. 130,757, filed August 11, 1961, now U.S. Patent No. 3,100,770.

The following examples are illustrative but not limitative of the invention. All temperatures are stated in degree centigrade.

*Example 1*

32.8 g. of 2-(2-aminobenzoyl)-pyridine and 200 cc. of acetic anhydride were stirred at room temperature for 3 hours and then permitted to stand overnight. Evaporation to dryness and digestion of the residue with 200 cc. of water containing a little sodium bicarbonate to make the pH slightly alkaline gave 2-(2-acetamidobenzoyl)-pyridine as a light tan powder, which upon crystallization from methanol formed colorless crystals melting at 151–153°.

*Example 2*

A solution of 8.6 cc. of bromine in 100 cc. of acetic acid was added slowly over a 3.5 hour period to a stirred solution of 38.5 g. of 2-(2-acetamidobenzoyl)-pyridine in 250 cc. of acetic acid. The dark solution was stirred for another 3 hours, permitted to stand overnight, stirred for 1 hour with $N_2$ sweeping, and evaporated at diminished pressure in the hood. The gummy residue (75 g.) was treated with water and ether, made alkaline with dilute sodium bicarbonate solution, and separated. Both phases contained undissolved product which was filtered off. Additional crops were obtained by further extraction of the aqueous phase with ether and evaporation of the resulting ether solutions. All these materials were recrystallized from methanol (decolorizing carbon added) yielding 2-(2-acetamido-5-bromobenzoyl)-pyridine as yellow crystals melting at 131.5–133°.

*Example 3*

20.85 g. of 2-(2-acetamido-5-bromobenzoyl)-pyridine in 250 cc. of 20% hydrochloric acid in ethanol were heated to reflux for 2 hours. 100 cc. of alcohol were added after one hour to maintain fluidity. The mixture stood overnight, was chilled and filtered to give 20.5 g. of colorless crystalline 2-(2-amino-5-bromobenzoyl)-pyridine hydrochloride. Digestion of this hydrochloride with 0.5 liter hot water hydrolyzed this product to the free base, 2-(2-amino-5-bromobenzoyl)-pyridine which formed yellow crystals, melting at 98–100°.

Evaporation of the alcoholic mother liquor, water digestion of the residue, and alkalization of the water digests afforded additional crops of 2-(2-amino-5-bromobenzoyl)-pyridine.

*Example 4*

2 g. of 2-(2-aminobenzoyl)-pyridine and 2.1 g. of glycine ethyl ester hydrochloride in 100 cc. of pyridine were refluxed for 4 hours and then 50 cc. of pyridine distilled off. Another 2.1 g. of glycine ester salt and 50 cc. of pyridine were added, and reflux resumed for 4 hours, followed by distillation of 60 cc. of pyridine. The residual dark solution was evaporated at diminished pressure to a dark solid residue, to which was added water and 50 cc. of benzene. Separation, extraction of the aqueous layer with another 50 cc. of benzene, washing of the combined benzene extracts with 50 cc. of water, concentration to 25 cc., and addition of 25 cc. petroleum ether to the benzene solution gave, on chilling, crude brown crystals. The aqueous layer from extraction deposited, on standing, a tan powder. These two products were combined and crystallized twice from acetone yielding tan crystals of 5-(2-pyridyl)-3H-1,4-benzodiazepin-2(1H)-one melting at 231–232° dec. The acetone crystallization mother liquors yielded further product.

*Example 5*

2.12 g. of bromoacetyl bromide were dissolved in anhydrous ether (C.P.) to a total volume of 12 cc. Portions of this solution were added alternately with equivalent amounts of 1 N sodium hydroxide (total of 10.5 cc.) to 1.4 g. of 2-(2-amino-benzoyl)-pyridine, stirred in 50 cc. of ether. The mixture was kept as close to neutral as possible. The final mixture was separated and the ether layer washed several times with water, dried with anhydrous sodium sulfate, and evaporated. The oily residue was treated with about 40 cc. of 15% ammonia in methanol and after one hour, filtered and evaporated. The semisolid residue was digested with water and ether. Some solid remained undissolved. The solvents were separated, and the aqueous layer washed twice more with ether. Filtration of the undissolved material from the aqueous portion gave a small amount of greenish solid, which upon recrystallization from acetone gave 5-(2-pyridyl)-3H-1,4-benzodiazepin-2(1H)-one as colorless crystals, melting at 230–231° dec.

*Example 6*

1 g. of 2-(2-amino-5-bromobenzoyl)-pyridine and 0.75 g. of glycine ethyl ester hydrochloride in 100 cc. pyridine were refluxed for 4.5 hours. 55 cc. of pyridine were then distilled off over a 3-hour period. Another 0.75 g. of glycine ester salt and 75 cc. of pyridine were added, and refluxing resumed for 2 hours, followed by slow distillation of 80 cc. of pyridine over a 2-hour period. The concentrated solution was evaporated at diminished pressure to a dark fluid residue, to which 25 cc. of benzene and 25 cc. of water were added. The benzene layer was drawn off, washed with 25 cc. of water, diluted with 25–30 cc. of petroleum ether, and chilled yielding tan crystals, which upon crystallization from acetone (decolorizing carbon added) gave 7-bromo-5-(2-pyridyl)-3H-1,4-benzodiazepin-2(1H)-one as colorless crystals melting at 237–238.5° dec. Further processing of the mother liquors yielded additional product.

*Example 7*

1.09 g. of bromoacetylbromide was dissolved in anhydrous ether (C.P.) to a total volume of 30 cc. and 5.4 cc. of 1 N sodium hydroxide were diluted with water to 6 cc. total volume. Equivalent amounts of these solutions were added alternately to 1 g. of 2-(2-amino-5-bromobenzoyl)-pyridine, stirred in 50 cc. of ether, and the final mixture treated with ice. The ether layer was separated, washed with water, dried, and evaporated. The residue was mixed with 75 cc. of 20.3% ammonia in methanol. After 2 days, the solvent was evaporated, and the residue digested with ether and water. The water layer, containing some undissolved solid, was drawn off and filtered to give a tan solid, which upon crystallization twice from acetone gave tan crystals of 7-bromo-5-(2-pyridyl)-3H-1,4-benzodiazepin-2(1H)-one melting at 238–240° dec. Evaporation of the ether layer and processing of the various mother liquors afforded additional product.

*Example 8*

1.36 g. of chlorine, dissolved in 50 g. of glacial acetic acid, were added over a fifteen-minute period to a cold, stirred solution of 3.57 g. of 2-o-aminobenzoylpyridine in 25 cc. of glacial acetic acid. After stirring for fifteen minutes, the solution was left overnight at room temperature and then evaporated at diminished pressure. The dark red, oily residue was digested briefly on the steam bath with 50 cc. of water and then stirred at room temperature. Most of the gum dissolved, and the mixture, after standing for 3.5 days, deposited a yellow solid, which on crystallization from 40 cc. of ligroin (B.P. 90–120°) gave 2-(2-amino-5-chlorobenzoyl)-pyridine as golden-yellow crystals, M.P. 98.5–101°.

*Example 9*

To a solution of 4.66 g. of 2-(2-amino-5-chlorobenzoyl)-pyridine in 150 cc. of glacial acetic acid were added 1.8 ml. of bromoacetylbromide. The system was protected by a drying-tube of anhydrous calcium chloride and the solution stirred for several hours. Evaporation at diminished pressure left a red oil, which was mixed with 225 cc. of liquid ammonia at −70°. The solution which formed was permitted to stand overnight at room temperature to allow slow evaporation of ammonia. The solid residue was stirred with 100 cc. of water, chilled, and filtered to yield a green powder. The product was recrystallized from 150 cc. of alcohol to give 7-chloro-5-(2-pyridyl)-3H-1,4-benzodiazepin-2(1H)-one as yellow crystals, M.P. 224.5–225.5° dec.

Example 10

11.2 g. of 5-(2-pyridyl)-3H-1,4-benzodiazepin-2(1H)-one was dissolved in 100 cc. of cold concentrated sulfuric acid and stirred at 5°. A solution of 5.04 g. of potassium nitrate in 30 cc. of concentrated sulfuric acid was then added slowly over a one-hour period. After stirring an additional 1.5 hours at 5°, the nitration mixture was poured onto ice in a vessel cooled by an ice-salt bath. The resultant clear yellow solution was stirred at 5° while adding 450 cc. of concentrated ammonium hydroxide. The final pH was about 8.0. Filtration of the precipitate yielded a crude, pale yellow solid, which was recrystallized from about 1.1 liter alcohol (a little water was added to effect final solution) to yield 7-nitro-5-(2-pyridyl)-3H-1,4-benzodiazepin-2(1H)-one as colorless crystals which upon further crystallization first from alcohol and then from acetone melted at 253.5–254.5° dec.

Example 11

7.5 g. of 7-bromo-5-(2-pyridyl)-3H-1,4-benzodiazepin-2(1H)-one were dissolved in 375 cc. dimethylformamide. To the pale yellow solution were added 1.3 g. of sodium methylate, with stirring at 5°. The solution darkened to brown-yellow and was stirred at 5° for two hours, during which time turbidity developed and a precipitate gradually formed. 1.5 ml. of methyl iodide were then added from a pipette. A clear solution soon re-formed and the color lightened. After two hours of stirring at 5°, the slightly turbid solution was evaporated at diminished pressure to a viscous residue, which was transformed to a semi-solid crystalline mass on standing overnight. The residue was stirred with 100 cc. of water for four hours, and the mixture chilled and filtered to give a tan powder which upon crystallization from 30 cc. of alcohol yielded 7-bromo-1-methyl-5-(2-pyridyl) - 3H - 1,4-benzodiazepin-2(1H)-one as tan crystals which upon further crystallization from ethyl acetate melted at 135.5–137°.

Example 12

To a solution of 14.25 g. of 2-(2-amino-5-bromobenzoyl)-pyridine in 0.7 liter of glacial acetic acid were added, over a ten minute period with stirring at room temperature, 5.7 ml. of α-bromopropionyl bromide. The initial red solution became very dark and, after stirring for 3.5 hours, the clear dark brown solution was evaporated at diminished pressure. The residual brown oil was mixed with 0.5 liter of liquid ammonia and the mixture permitted to stand overnight. The solid remaining after ammonia evaporation was digested with 0.5 liter of water. Chilling and filtration gave a crude product which was recrystallized from 300 cc. of benzene yielding 7-bromo-3-methyl-5-(2-pyridyl)-3H-1,4-benzodiazepin - 2(1H) - one as a cream crystalline powder which upon further crystallization from benzene and finally from acetone melted at 227.5–229° dec.

Example 13

48 g. of 2-(2-amino-5-bromobenzoyl)-pyridine, 28.1 g. of hydroxylamine hydrochloride, and 260 cc. alcohol were refluxed for twenty-two hours. The solution was then chilled, concentrated at diminished pressure to 100 cc. volume, and diluted with an equal volume of water. The solution was stirred and neutralized with approximately 150 cc. 3 N sodium carbonate. To the resulting slurry were added 100 cc. of water and 200 cc. of benzene. After stirring for sixteen hours, 200 cc. of petroleum ether were added and agitation continued for 2.5 hours. Chilling and filtration yielded 2-(2-amino-5-bromobenzoyl)-pyridine oxime as a tan powder which upon crystallization from benzene melted at 163–165.5° (not sharp).

Example 14

To 5.84 g. of 2-(2-amino-5-bromobenzoyl)-pyridine oxime dissolved in 50 cc. of acetic acid, were added 1.6 ml. of chloroacetyl chloride. After initial cooling, the solution was stirred for eighteen hours at room temperature. The final mixture, containing a cream precipitate, was evaporated at diminished pressure to a tan solid residue, which was suspended in 50 cc. of water and neutralized with aqueous sodium carbonate while stirring at 5°. Filtration gave a crude product which upon crystallization from 100 cc. of alcohol yielded 2-(2-chloroacetamido-5-bromobenzoyl)-pyridine oxime as slightly pink crystals, which upon being further recrystallized from alcohol, melted at 166.5–168° dec.

Example 15

0.4 ml. of chloroacetyl chloride was added to 1.46 g. of 2-(2-amino-5-bromobenzoyl)-pyridine oxime in 10 cc. of glacial acetic acid, with stirring at 5°. After stirring overnight at room temperature, dry hydrogen chloride was passed into the slightly turbid, brown solution for three hours at 5°. The solution was then stirred overnight at room temperature and evaporated at diminished pressure to a yellow oil, to which were added 22 cc. of methylene chloride. Upon stirring, a brown gummy lump formed in the yellow liquor. Addition of 25 cc. of cold 3 N sodium carbonate and agitation for one hour failed to dissolve the gum. The liquid was then decanted and separated and the aqueous layer extracted with methylene chloride. The combined organic layers were washed with water, dried over anhydrous sodium sulfate, and evaporated to give a yellow solid, which was recrystallized from 50 cc. of alcohol yielding 2-chloromethyl-4-(2-pyridyl)-6-bromo-quinazoline 3-oxide as yellow crystals, M.P. 206° dec. Additional product was isolated by alcohol recrystallization of the gum.

Example 16

3.8 g. 2-(2-chloroacetamido-5-bromobenzoyl)-pyridine oxime were dissolved in 75 cc. glacial acetic acid and dry hydrogen chloride introduced for six hours with stirring at 5°. The solution was left overnight at room temperature and then evaporated at diminished pressure to a yellow oil, to which were added 50 cc. each of methylene chloride and 3 N sodium carbonate. The mixture was agitated for one hour and filtered. The filtrate was separated and the aqueous layer extracted twice with methylene chloride. The combined organic layers were washed with water, dried with anhydrous sodium sulfate, and evaporated at diminished pressure. The residual yellow solid was dissolved in 150 cc. boiling alcohol (decolorizing carbon added), and the solution filtered and concentrated to a volume of 100 cc. Chilling precipitated a crude product which was stirred for 0.5 hour at 5° with 5 cc. 3 N sodium carbonate. Filtration and recrystallization from 150 cc. alcohol gave 2-chloromethyl-4-(2-pyridyl)-6-bromoquinazoline 3-oxide as pale yellow crystals, M.P. 209° dec.

Concentration of the recrystallization mother liquor to about 50 cc. yielded additional product.

Example 17

3.04 g. 2 - chloromethyl - 4-(2-pyridyl)-6-bromoquinazoline 3-oxide and 100 cc. methanolic methylamine (15–20%) were mixed at room temperature and stirred for twenty-two hours. A clear, red-brown solution formed within a short time and then gradually assumed a yellow color. The solution was filtered to remove a few particles of dirt and evaporated at diminished pressure.

The residue was dissolved in methylene chloride, and the solution washed with water, dried with anhydrous sodium sulfate, and evaporated. The gummy residue was taken up in 50 cc. boiling acetone (decolorizing carbon added), and the solution chilled and diluted with 20 cc. petroleum ether, added in 5 cc. portions. The resultant precipitate, on filtration, consisted of 7-bromo-2-methylamino-5-(2-pyridyl)-3H-1,4-benzodiazepine 4-oxide. The cream, crystalline product was recrystallized from acetone and melted at 231–233° dec.

Example 18

A mixture of 4-(2-aminobenzoyl)-pyridine (19.8 g.) in acetic anhydride (200 cc.) and concentrated sulfuric acid (0.1 cc.) was allowed to stand at room temperature for four hours. The mixture was concentrated at 80° under reduced pressure to an oil. The residue was dissolved in benzene (100 cc.), washed with 3 N sodium hydroxide solution (2 x 50 cc.), saturated brine solution (2 x 50 cc.) and concentrated to a small volume. The crystals were filtered yielding 4-(2-acetamidobenzoyl)-pyridine as white prisms melting at 161–162°.

Example 19

A mixture of 4-(2-aminobenzoyl)-pyridine (5.0 g.) and carbobenzoxyglycine (5.3 g.) in methylene chloride (200 cc.) was cooled to 19°. N′,N′-dicyclohexylcarbodiimide (5.2 g.) was added and the solution stirred for two hours. The mixture was then refrigerated for three days and N,N′-dicyclohexyl urea was filtered off and discarded. The methylene chloride solution was concentrated in vacuo at room temperature to a mixture of oil and crystals. The residue was dissolved in benzene and after filtration was chromatographed through a column of florisil (90 g.). The benzene fractions were discarded and the eluent changed to ether. The ether fractions gave [2-(4-pyridydlcarbonyl)phenyl]carbamoylmethylcarbamic acid benzyl ester as white needles which were recrystallized from benzene/petroleum ether and melted at 130–130.5°.

Example 20

A solution of hydrogen bromide in glacial acetic acid (33% wt./wt.) (20 cc.) was added dropwise, at room temperature, to a stirred solution of [2-(4-pyridylcarbonyl)phenyl]-carbamoylmethylcarbamic acid benzyl ester (3.5 g.) in glacial acetic acid (10 cc.). When the addition was complete the mixture was stirred an additional four hours and diluted with 1 liter of ethyl ether. The precipitate was filtered, dissolved in water (100 cc.) and the solution brought to pH 8 with concentrated ammonium hydroxide solution. The resulting precipitate was filtered and recrystallized from benzene to give 5-(4-pyridyl)-3H-1,4-benzodiazepin-2(1H)-one as white needles melting at 206–207°.

Example 21

A solution of 4-(2-aminobenzoyl)-pyridine (5.0 g.) in N,N-dimethyl formamide (20 cc.) was saturated with hydrogen bromide. To the resulting mixture, bromoacetyl bromide (5.1 g.), was added dropwise with stirring. A solution of pyridine (4.0 g.) in N,N-dimethylformamide (5 cc.) was added over a five minute period. The mixture was allowed to stir for seven hours, when approximately 300 cc. of liquid ammonia was carefully added. The ammonia was allowed to evaporate overnight and the reaction mixture was taken up in benzene (100 cc.). Ammonium bromide was filtered off and discarded and the benzene soution washed with water (3 x 100 cc.) and evaporated to an oil under reduced pressure. The product was crystallized from a benzene/ether mixture to give 4-(2-amino-acetamidobenzoyl)-pyridine melting at 122–125°, which on recrystallization from acetone/hexane spontaneously ring closed to give white needles.

Example 22

4-(2-aminobenzoyl)-pyridine (16 g.) was dissolved in glacial acetic acid and a solution of bromoacetylbromide (20.1 g.) in glacial acetic acid (10 cc.) was added dropwise. The resulting solution was stirred overnight and the acetic acid removed under reduced pressure. Liquid ammonia, approximately 500 cc. was carefully added to the residue and allowed to evaporate. The reaction mixture was then taken up in methylene chloride (250 cc.) washed with 1 N sodium hydroxide (3 x 50 cc.), water (3 x 100 cc.), saturated brine solution (2 x 100 cc.), dried over anhydrous sodium sulfate, treated with decolorizing carbon and filtered. The solvent was removed under reduced pressure and the crystalline mass was recrystallized from benzene to give 5-(4-pyridyl)-3H-1,4-benzodiazepin-2(1H)-one as white needles.

Example 23

A solution of potassium nitrate (2.53 g.) in concentrated sulfuric acid (15 cc.) was added dropwise at 0° to a solution of 5-(4-pyridyl)-3H-1,4-benzodiazepin-2(1H)-one (6.0 g.) in concentrated sulfuric acid (30 cc.). The reaction mixture was stirred at 0° for two hours and then 150 g. of crushed ice was carefully added. The solution was kept at 0° and brought to pH 8 by the addition of about 150 cc. of concentrated ammonium hydroxide solution. The mixture was extracted with methylene chloride (3 x 100 cc.), the organic layers were combined and washed with water (3 x 100 cc.) and saturated brine solution (2 x 100 cc.). After drying over anhydrous sodium sulfate and filtering, the solvent was removed under reduced pressure. Recrystallization of the residue from acetone gave 7-nitro-5-(4-pyridyl)-3H-1,4-benzodiazepin-2(1H)-one as pale yellow needles meltting at 242–242.5°.

Example 24

A solution of the 4-(2-aminobenzoyl)-pyridine (30 g.) in glacial acetic (200 cc.) was cooled to 5° in an ice-salt bath. To this was added dropwise with stirring a solution of bromine (25 g.) in glacial acetic acid (5 cc.). The mixture was stirred for ten minutes, diluted with water (300 cc.) and made alkaline with sodium hydroxide pellets. The crystalline residue was filtered and washed with water. The mixture of brominated ketones was dissolved in benzene and the water removed by azeotropic distillation. The benzene solution was concentrated to a small volume and chromatographed on a column of Grade I alumina (Woelm neutral) (300 g.). Elution with 50% benzene/ether (v./v.), gave 4-(5-bromo-2-aminobenzoyl)-pyridine as yellow prisms which upon crystallization from chloroform melted at 213–214°.

Example 25

A solution of 13 g. of 4-(2-amino-5-bromobenzoyl)-pyridine in 50 cc. of N,N-dimethylformamide was saturated with hydrogen bromide. Then 7.35 g. of bromoacetyl bromide was added to the mixture dropwise with stirring. A solution of 5.76 g. of pyridine in 5 cc. of N,N-dimethylformamide was then added thereto over a 5-minute period. The mixture was allowed to stir for 7 hours, when approximately 500 cc. of liquid ammonia was carefully added. The ammonia was allowed to evaporate overnight, and the reaction mixture was taken up in 300 cc. of benzene. Ammonium bromide was filtered off and discarded, and the benzene solution washed with water (3 x 100) and evaporated at reduced pressure to an oil, which upon crystallization from acetone formed white needles of 7-bromo-5-(4-pyridyl)-3H-1,4-benzodiazepin-2-(1H)-one, melting at 228–228.5-.

Example 26

A solution of 9.5 g. of 7-bromo-1,3-dihydro-5-(2-pyridyl)-2H-1,4-benzodiazepin-2-one in 0.4 liter of tetrahydrofuran was added over a one-hour period to a suspension of 4.0 g. of lithium aluminum hydride in 0.1 liter of tetrahydrofuran. The mixture was refluxed for five minutes, cooled in an ice-bath and stirred for ¾ of an hour. After careful addition, first, of about 0.6 liter of ether saturated with water, and then, of 20 ml. of water, the mixture was filtered by suction through a bed of filter aid. The yellow, homogeneous filtrate was dried over anhydrous sodium sulfate, filtered and evaporated. The residual red-brown gum was stirred for two hours with 0.25 liter of anhydrous ether. The mixture was then filtered and the filtrate evaporated.

The residue was dissolved in benzene and chromatographed through a column of 270 g. of alumina (Woelm, neutral activity grade 1). Washing with benzene removed impurities. Elution with benezene-ethyl acetate (3:1) afforded fractions which contained a yellow solid material.

The yellow solid material-containing fractions were combined, dissolved in anhydrous ether, stirred with activated charcoal and anhydrous magnesium sulfate and filtered through a sindtered glass funnel. Evaporation of the filtrate left a yellow, crystalline solid which was recrystallized from ether, yielding 7-bromo-2,3-dihydro-5-(2-pyridyl)-1H-1,4-benzodiazepine as yellow crystals; M.P. 182(sinters)–183–184° dec. (corr.).

Example 27

0.145 kg. of 2-(2-amino-5-bromobenzoyl)-pyridine, as prepared in Example 3, was dissolved in 2.0 l. of glacial acetic acid. The resultant solution was placed in a 3-liter, 3-necked, round bottom flask fitted with a stirrer, thermometer and dropping funnel. The system was protected by a drying tube filled with anhydrous calcium chloride. To the solution, with stirring at room temperature, were carefully added 46.7 ml. of bromoacetyl bromide. After the addition was completed, the stirring was continued for two hours. The mixture was then warmed to 40° C., stirred at that temperature for 1.5 hours, chilled and filtered. The residue, after being washed with glacial acetic acid, was dried in vacuo over flake potassium hydroxide to give 2-(2-bromoacetamido-5-bromobenzoyl)-pyridine hydrobromide orange crystals, M.P. 205–206° C. dec.

The hydrobromide was hydrolyzed to the free base as follows: 0.119 kg. of 2-(2-bromoacetamido-5-bromo-benzoyl)-pyridine hydrobromide was stirred with 1.2 l. of cold water for 3.5 hours. The mixture was chilled and filtered, and the residue washed with cold water and dried to give 2-(2-bromoacetamido-5-bromobenzoyl)-pyridine, M.P. 101(sinters)–103–106° dec.

Example 28

93.0 gms. of 2-(2-bromoacetamido-5-bromobenzoyl)-pyridine was carefully added to 0.5 l. of anhydrous ammonia in a 1-liter, 3-necked, round bottom flask equipped with stirrer and reflux condenser and cooled by a Dry Ice-acetone bath. The system was protected from moisture by a drying tube containing anhydrous calcium chloride. After stirring for two hours, the cooling bath was removed. The mixture was then stirred for 6 hours, during which time the ammonia gradually boiled off. 0.4 l. of water was added to the solid residue and stirring was resumed for about two hours. The solid was then filtered off, washed with water and dried in vacuo over potassium hydroxide flakes. The residue was dissolved on a steam bath in 1.4 l. of ethyl alcohol-acetonitrile (1:1)(decolorizing charcoal added). The solution was filtered hot and the filtrate chilled overnight. The crystalline deposite was filtered off, washed with cold ethyl alcohol and dried in vacuo over flake potassium hydroxide to give 54.2 gms. 7-bromo-1,3-dihydro-5-(2-pyridyl)-2H-1,4-benbodiazepin-2-one, M.P. 238(sinters)–239–240.5° dec. Further processing of the mother liquor yielded additional product.

Example 29

To 100 ml. of 15% butyl lithium in hexane dissolved in 200 ml. of ether and cooled to −40°, 14.7 ml. of 2-bromopyridine in 60 ml. of ether was carefully added with stirring. After 15 min., 20.7 g. of o-chlorobenzonitrile in 75 ml. of ether was added to the reaction mixture while maintaining the temperature at −50°. After stirring for 1 hr., the reaction medium was allowed to warm to about 10°. It was then cooled in an ice bath and decomposed by the addition of 150 ml. of water and 100 ml. of 3 N hydrochloric acid. The organic layer was separated and re-extracted with 3 N hydrochloric acid. The combined acid layers were heated on a steam bath for 1 hr., cooled and neutralized with sodium hydroxide. The aqueous phase was extracted with ether and the ether layer washed with brine and dried over sodium sulfate. Ether was distilled off and the residue was converted to the hydrochloride with a solution of hydrogen chloride in methanol. The solvent was distilled off and the residue crystallized from acetonitrile to give 2-(2-chlorobenzoyl)pyridine hydrochloride, melting at 157–163°. The free base was then liberated and crystallized from hexane as colorless prisms to give 2-(2-chlorobenzoyl) pyridine melting at 52–54°.

The hydrochloride was recrystallized from acetonitrile and melted at 160–164°.

To a solution of 42.8 g. of 2-(2-chlorophenyl)pyridylcarbinol in 300 ml. of acetic acid, there was carefully added a solution of 19.5 g. of chromic acid in 40 ml. of water. The temperature rose to 45° during ½ hr. The reaction was then heated to 60° for 2 hrs. The resultant solution was poured into 1.5 l. of cold water. The crystalline product that formed was filtered off and recrystallized from hexane to give 2-(2-chlorobenzoyl)pyridine, M.P. 52–54°.

Example 30

A solution of 5.0 g. of 2-(2-chlorobenzoyl)pyridine in 25 ml. of concentrated sulfuric acid was cooled to 0°. A solution of 1.2 ml. of 90% nitric acid in 3 ml. of sulfuric acid was added slowly keeping the temperature at about 0°. After stirring for 1 hr. at 0°, the temperature was allowed to rise to about 20° during 1 hr. The solution was then added to ice and the mixture neutralized by the addition of ammonium hydroxide. The crystalline product was filtered and dried to give 2-(2-chloro-5-nitrobenzoyl)-pyridine, M.P. 135–137°. Recrystallization from cyclohexane or a mixture of benzene and hexane gave colorless rods melting at 137–138°.

Example 31

A solution of 125 ml. of butyl lithium (15% in hexane) in 250 ml. of ether was cooled to −50° and 18.2 ml. of 2-bromopyridine in 75 ml. of ether was added carefully while maintaining the temperature at −50°. After 15 min., a solution of 38.2 g. of 2-chloro-5-trifluoromethylbenzonitrile in 100 ml. of ether was carefully added. The cooling bath was then removed and the reaction stirred for 90 min. It was chilled to 0° and decomposed by the addition of 200 ml. of water followed by 150 ml. of 3 N hydrochloric acid. The aqueous phase was separated and the ether layer was diluted by the addition of 50 ml. of ether, washed with dilute sodium bicarbonate and dried over sodium sulfate. The residue obtained after distilling off the ether was crystallized from hexane to give 2-(2-chloro-5-trifluoromethylbenzoyl)pyridine, melting at 59–60°. Repeated crystallization from hexane gave colorless rhombs melting at 67–69°.

Example 32

A solution of 20 g. of 2-(2-chloro-5-trifluoromethylbenzoyl)pyridine in 200 ml. of pyridine and 50 ml. of ethylene diamine was refluxed for 5½ hrs. The mixture was concentrated to dryness in vacuo, and the residue partitioned between methylene chloride and dilute sodium carbonate. The organic layer was separated, washed with brine, and dried over sodium sulfate. The solvent was distilled off and the residue dissolved in 600 ml. of 1 N hydrochloric acid. A precipitate which formed was filtered off and the filtrate was made basic by the addition of ammonia. The aqueous solution was extracted with methylene chloride and the organic layer was dried over sodium sulfate. The residue obtained by distilling off the methylene chloride was dissolved in 500 ml. of toluene. The resultant solution was refluxed for 3 hrs. while distilling off water azeotropically. Toluene was distilled off and the residue crystallized from a mixture of benzene and hexane to give 2,3-dihydro-5-(2-pyridyl)-7-trifluoromethyl-1H-1,4-benzodiazepine, melting at 181–183°.

Example 33

A solution of 2-bromochlorobenzene (105.3 g., 0.55 mole) in anhydrous ether (500 ml.) was converted to the Grignard reagent, by reaction with magnesium (13.38 g., 0.55 g.-atoms), under an atmosphere of dry nitrogen. Addition of 2-bromochlorobenzene required about 2 hours, during which time the ether refluxed gently, due to the heat of reaction. Formation of the Grignard reagent was completed by refluxing the mixture for an additional hour. The mixture was next stirred at room temperature during the dropwise addition of a solution of freshly distilled 2-cyanopyridine (52.0 g., 0.50 moles) in dry benzene (500 ml.), over ½–1 hour. The mixture was then stirred, and concentrated with heat in an oil bath. After half of the solvent was evaporated, the mixture was refluxed for 8 hours. It was thereafter cooled to 5–10° C. in an ice-water bath while carefully adding ice cold 3 N hydrochloric acid (500 ml.), with stirring. Stirring was continued for 2–3 hours at room temperature. The aqueous layer was separated, and the organic layer was extracted with 3 N hydrochloric acid (2 x 250 ml.). The combined hydrochloric acid extracts were heated for 1 hour on a steam bath, under a reflux condenser, and were then cooled, made basic with 5 N sodium hydroxide solution, and extracted with ether. The ether extract was washed with water, dried over anhydrous sodium sulfate, and evaporated, to give the 2-(2-chlorobenzoyl)-pyridine as a brown oil. The oil was purified by distillation from an oil bath (159–183° C.), at 0.35–0.20 mm. pressure. The yellow liquid distillate readily crystallized to a pale yellow crystalline mass of the product, M.P. 48–50° C.

Example 34

A solution of 2-(2-chloro-5-nitrobenzoyl)pyridine (10.66 g., 40.6 millimoles) in a mixture of anhydrous pyridine (40 ml.) and ethylenediamine (13.6 ml., 203 millimoles) was refluxed for 5 hours. It was then concentrated in vacuo, and poured into water. The resulting yellow crystalline precipitate was filtered off. The cake was washed with water and refluxed with 1 N hydrochloric acid (100 ml.) for 3 hours. The solution was then cooled, diluted with water (150 ml.), and extracted with ether. The aqueous acid layer was made basic with 3 N sodium hydroxide solution and extracted with methylene chloride. Evaporation of the washed methylene chloride extract gave a yellow-brown crystalline residue. This was refluxed with pyridine (50 ml.) for 3 hours, and then evaporated in vacuo. The resulting brownish crystalline residue was triturated with methylene chloride and water. A yellow crystalline product which formed was filtered off, and recrystallized from ethanol (required about 1 liter), to give 2,3-dihydro-7-nitro-5-(2-pyridyl)-1H-1,4-benzodiazepine.

Example 35

A solution of 2,3-dihydro-7-nitro-5-(2-pyridyl)-1H-1,4-benzodiazepine (1.70 g., 6.34 millimoles) in anhydrous N,N-dimethylformamide (17 ml.), was treated with sodium methoxide (0.38 g., 7.0 millimoles), and stirred for 1 hour at room temperature. The solution was then cooled in an ice bath while a mixture of dimethyl sulfate (0.88 g., 7.0 millimoles) and dimethylformamide (3 ml.) was carefully added over 15–20 minutes. Stirring was continued for 3 hours at room temperature, and then the mixture was poured into ice water, and stirred until the resulting precipitate crystallized. 2,3-dihydro-1-methyl-7-nitro-5-(2-pyridyl)-1H-1,4-benzodiazepine was filtered off, and dried, giving prisms, M.P. 175–177° C. Recrystallizations from methylene chloridehexane, and from 1:1 aqueous ethanol gave the product with a M.P. 181–183°.

Example 36

To a solution of 4.6 g. of 2,3-dihydro-5-(2-pyridyl)-7-trifluoromethyl-1H-1,4-benzodiazepine in 50 ml. of N,N-dimethylformamide, 850 mg. of sodium hydride (53% in mineral oil) was added. After stirring for 45 min., 1.6 ml. of dimethylsulfate in 5 ml. of N,N-dimethylformamide was added slowly. The reaction became warm and was cooled to about 20° in a water bath. It was then stirred for 3 hrs. at room temperature, poured into 600–700 ml. of cold water, and extracted with ether. The ether layer was washed with water, dried over sodium sulfate and concentrated to dryness. The residue was added to a mixture of benzene and hexane. A crystalline material which formed after such addition was removed by filtration. The filtrate was concentrated to dryness in vacuo, dissolved in benzene and adsorbed on 60 g. of alumina. Elution with mixtures of benzene and methylene chloride gave 2,3-dihydro-1-methyl-5-(2-pyridyl)-7-trifluoromethyl-1H-1,4-benzodiazepine, which crystallized from hexane as light yellow rods melting at 127–129°.

Example 37

A solution of 37 g. of 2-(2-chloro-5-nitrobenzoyl)pyridine in 900 ml. of ethanolic ammonia (16% w./v.) was heated for 5 hrs. at 120–125°. The dark solution was concentrated to dryness in vacuo and the residue was crystallized from a mixture of benzene and hexane to give 2-(2-amino-5-nitrobenzoyl)pyridine melting at 150–153°. Further recrystallization raised the melting point to 156–158°.

Example 38

A mixture of 41 g. of 2-(2-chloro-5-trifluoromethylbenzoyl)pyridine in 300 ml. of dioxane and 300 ml. of concentrated ammonium hydroxide containing 5 g. of cuprous chloride was heated for 10 hrs. at 140° in an autoclave. The reaction mixture was concentrated to a small volume and partitioned between methylene chloride and water. The organic layer was dried over sodium sulfate and concentrated to dryness. The residue thus obtained was stirred in a two-phase system containing ether and 1 N hydrochloric acid for 1 hr. The ether layer was separated, washed with dilute sodium bicarbonate and water and dried over sodium sulfate. Ether was distilled off and the residue was dissolved in benzene and adsorbed on alumina. Elution with benzene and methylene chloride removed some impurities while elution with ether gave impure 2-(2-amino-5-trifluoromethylbenzoyl)pyridine as shown by thin layer chromatography. Further elution with a mixture of ether and ethyl acetate (95.5%) gave a fraction which on crystallization from hexane gave 2-(2-amino-5-trifluoromethylbenzoyl)pyridine melting at 89–92.5° Recrystallization from hexane gave clusters of yellow plates melting at 91.5–93.5°.

Continued elution with ether-ethyl acetate (90:10) gave 2-(2-amino-5-cyanobenzoyl)pyridine which crystallized from benzene and hexane as yellow leaflets melting at 147–152°. Recrystallization from the same solvents raised the melting point to 153–155°.

Example 39

A suspension of 2,3-dihydro-1-methyl-7-nitro-5-(2-pyridyl)-1H-1,4-benzodiazepine (16.90 gm., 60.0 millimoles) in methanol (340 ml.) was hydrogenated at 24° C. and 754 mm. pressure, over an alcohol-washed Raney nickel catalyst (2 teaspoonfuls, activity ca. W–2). Uptake of hydrogen ceased after 3–5 hours (2.7 mols.). The catalyst was filtered off on a bed of "Hyflo," washed with methanol, and discarded. The filtrate and the washings were combined, acidified with excess methanolic 2 N-hydrogen chloride (100 ml.), and concentrated at <30° C., in vacuo, to about 100 ml. Ether (7–8 volumes) was added to precipitate the crude hydrochloride, which was filtered off, and recrystallized from methanol-acetonitrile, giving dark brown crystals. This was converted to the free base, by treatment with excess dilute sodium hydroxide solution. The base was extracted with methylene chloride. The extracts were washed with water, dried over anhydrous magnesium sulfate, and evaporated in vacuo, to give the crude product as a brown gum. This was dissolved in methylene chloride, and filtered through a short column containing "Woelm" neutral alumina, activity III (75 gm.). Evaporation of the eluates gave a slightly brownish yellow crystalline residue. Recrystallization from methylene chloride-hexane, benzene-hexane, and finally from methylene chloride-ether-petroleum ether (B.P. 40–60° C.) gave yellow prisms of 7-amino-2,3-dihydro-1-methyl-5-(2-pyridyl)-1H-1,4-benzodiazepine, M.P. 165–167°.

Example 40

A solution of 7-amino-2,3-dihydro-1-methyl-5-(2-pyridyl)-1H-1,4-benzodiazepine (6.60 gm., 26.2 millimoles) in 3 N-hydrochloric acid (54 ml., 162 milliequivalents) was swirled in a Dry Ice-ethanol bath at −5 to −10°, and treated dropwise with a solution of sodium nitrite (1.99 gm., 28.8 millimoles) in water (9 ml.), over 30–40 minutes. Towards the end of the reaction, the mixture was allowed to warm to +10°, and addition of sodium nitrite solution was continued until the starch-iodide reaction remained positive. The resulting diazonium chloride solution was then cooled to −10°, and added dropwise to a solution of cuprous chloride (5.74 gm., 58 millimoles) in a mixture of concentrated hydrochloric acid (25 ml., 290 milliequivalents) and water (12 ml.). The mixture was then diluted with water (100 ml.), heated in a water-bath at 35° (1 hr.), and then at 40° (1 hr.), until nitrogen-evolution ceased, and the diazo-test (R-salt) became negative. The reaction mixture was cooled to room temperature, made strongly basic with 28% aqueous ammonia, and extracted with methylene chloride. The extract was washed with water, dried over anhydrous magnesium sulfate, and evaporated, to give a dark-colored foam. This was extracted repeatedly with boiling benzene; the extracts were filtered to remove a tarry residue and were then chromatographed over a 25 x 210 mm. column of "Woelm" neutral alumina, activity III (100 gm.). Elution with methylene chloride, and evaporation of the eluates, gave a dark-colored, partly crystalline residue. This was partitioned between benzene and dilute hydrochloric acid. The aqueous acid layer was made basic with sodium hydroxide solution, and extracted with methylene chloride. The extract was washed with water, dried over anhydrous magnesium sulfate, and evaporated, to give a tan-colored crystalline residue. Recrystallization from benzene-hexane, and from ethanol, gave yellow prisms of 7-chloro-2,3-dihydro-1-methyl-5-(2-pyridyl)-1H-1,4-benzodiazepine, M.P. 152–154° C.

Example 41

To a solution of 300 mg. of 2-(2-amino-5-trifluoromethylbenzoyl)-pyridine in 10 ml. of acetic acid, a solution of 0.11 ml. of bromoacetyl bromide in 5 ml. of acetic acid was added slowly. The mixture was stirred for 3 hours at room temperature, warmed to 40° for 1 hour, then concentrated in vacuo to a small volume. The residue was triturated with ether, then filtered. The solid obtained was partitioned between ether and water. The ether layer was separated, dried over sodium sulfate and concentrated to dryness in vacuo. The residue crystallized from hexane to give 2-(2-bromoacetamido-5-trifluoromethylbenzoyl)-pyridine melting at 97–100°. Recrystallization from hexane gave rods melting at 98–101°.

Example 42

To a solution of 400 mg. of 2-(2-amino-5-cyanobenzoyl)-pyridine in 10 ml. of acetic acid, 0.16 ml. of bromoacetyl bromide was added. A thick oil separated immediately. After stirring for 3 hours at room temperature, the supernatant liquid was poured off and the oil layer was triturated with ether until it crystallized. The solid was filtered off and partitioned between water and ether. The ether layer was separated, dried over sodium sulfate and solvent then distilled off. The residue thus obtained was extracted with hot hexane. On cooling, 2-(2-bromoacetamido - 5 - cyanobenzoyl)pyridine, M.P. 114–121° crystallized from the hexane solution. Recrystallization from hexane gave a product melting at 116–121°.

We claim:
1. A compound of the formula

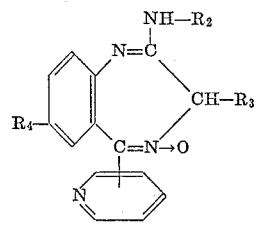

wherein $R_2$ and $R_3$ are selected from the group consisting of hydrogen and lower alkyl and $R_4$ is selected from the group consisting of hydrogen, halogen, nitro, trifluoromethyl and cyano.

2. 7-halo - 2 - methylamino-5-(2-pyridyl)-3H-1,4-benzodiazepine 4-oxide.

3. 7 - bromo-2-methylamino-5-(2-pyridyl)-3H-1,4-benzodiazepine 4-oxide.

4. A compound of the formula

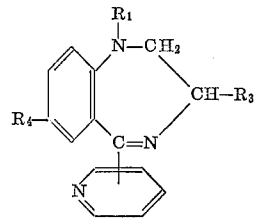

wherein $R_1$ and $R_3$ are selected from the group consisting of hydrogen and lower alkyl and $R_4$ is selected from the group consisting of hydrogen, halogen, nitro, trifluoromethyl, amino and cyano.

5. 7 - halo - 2,3 - dihydro-5-(2-pyridyl)-1H-1,4-benzodiazepine.

6. 7-bromo - 2,3 - dihydro-5-(2-pyridyl)-1H-1,4-benzodiazepine.

7. 2,3-dihydro-5-(2-pyridyl) - 7 - trifluoromethyl-1H-1,4-benzodiazepine.

8. 2,3-dihydro - 7 - nitro-5-(2-pyridyl)-1H-1,4-benzodiazepine.

References Cited by the Examiner
UNITED STATES PATENTS

| | | | |
|---|---|---|---|
| 3,100,770 | 8/63 | Fryer et al. | 260—239.3 |
| 3,117,129 | 1/64 | Boyle | 260—297 |
| 3,118,899 | 1/64 | Cislak | 260—297 |
| 3,131,178 | 4/64 | Archer et al. | 260—239 |

IRVING MARCUS, *Primary Examiner.*

NICHOLAS S. RIZZO, *Examiner.*

UNITED STATES PATENT OFFICE
CERTIFICATE OF CORRECTION

Patent No. 3,182,067 May 4, 1965

Rodney Ian Fryer et al.

It is hereby certified that error appears in the above numbered patent requiring correction and that the said Letters Patent should read as corrected below.

Column 6, line 67, for "sedative" read -- sedatives --; column 10, line 30, for "22 cc." read -- 20 cc. --; line 34, for "liquid" read -- liquor --; column 12, line 39, for "acetic" read -- acetic acid --; line 70, for "228-228.5-" read -- 228-228.5° --; column 13, line 21, for "sindtered" read -- sintered --; column 14, line 63, for "50 ml." read -- 500 ml. --.

Signed and sealed this 5th day of October 1965.

(SEAL)
Attest:

ERNEST W. SWIDER
Attesting Officer

EDWARD J. BRENNER
Commissioner of Patents